US009058835B2

(12) United States Patent
McCabe

(10) Patent No.: US 9,058,835 B2
(45) Date of Patent: Jun. 16, 2015

(54) METHODS AND SYSTEMS FOR OPTIMIZED STAGGERED DISK DRIVE SPINUP

(71) Applicant: Western Digital Technologies, Inc., Irvine, CA (US)

(72) Inventor: Timothy J. McCabe, Mission Viejo, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/802,337

(22) Filed: Mar. 13, 2013

(65) Prior Publication Data

US 2014/0268402 A1 Sep. 18, 2014

(51) Int. Cl.
 *G11B 15/46* (2006.01)
 *G11B 19/20* (2006.01)
 G11B 19/28 (2006.01)
 G06F 1/26 (2006.01)

(52) U.S. Cl.
 CPC .............. *G11B 19/209* (2013.01); G11B 19/28 (2013.01); *G11B 19/2054* (2013.01); G06F 1/26 (2013.01)

(58) Field of Classification Search
 None
 See application file for complete search history.

(56) References Cited

U.S. PATENT DOCUMENTS

| 6,499,054 | B1 | 12/2002 | Hesselink et al. |
| 6,732,158 | B1 | 5/2004 | Hesselink et al. |
| 6,966,006 | B2 | 11/2005 | Pacheco et al. |
| 7,120,692 | B2 | 10/2006 | Hesselink et al. |
| 7,370,220 | B1 | 5/2008 | Nguyen et al. |
| 7,447,926 | B1 * | 11/2008 | Burroughs et al. ........... 713/300 |
| 7,454,443 | B2 | 11/2008 | Ram et al. |
| 7,467,187 | B2 | 12/2008 | Hesselink et al. |
| 7,546,353 | B2 | 6/2009 | Hesselink et al. |
| 7,587,467 | B2 | 9/2009 | Hesselink et al. |
| 7,600,036 | B2 | 10/2009 | Hesselink et al. |
| 7,661,005 | B2 | 2/2010 | Spengler et al. |
| 7,788,404 | B2 | 8/2010 | Hesselink et al. |
| 7,917,628 | B2 | 3/2011 | Hesselink et al. |
| 7,934,251 | B2 | 4/2011 | Hesselink et al. |
| 7,949,564 | B1 | 5/2011 | Hughes et al. |
| 8,004,791 | B2 | 8/2011 | Szeremeta et al. |
| 8,255,661 | B2 | 8/2012 | Karr et al. |
| 8,285,965 | B2 | 10/2012 | Karr et al. |
| 8,296,513 | B1 | 10/2012 | Liu |
| 8,341,117 | B2 | 12/2012 | Ram et al. |
| 8,341,275 | B1 | 12/2012 | Hesselink et al. |
| 8,352,567 | B2 | 1/2013 | Hesselink et al. |
| 8,526,798 | B2 | 9/2013 | Hesselink |
| 8,631,284 | B2 | 1/2014 | Stevens |
| 8,646,054 | B1 | 2/2014 | Karr et al. |
| 8,661,507 | B1 | 2/2014 | Hesselink et al. |
| 8,688,797 | B2 | 4/2014 | Hesselink et al. |
| 8,713,265 | B1 | 4/2014 | Rutledge |

(Continued)

OTHER PUBLICATIONS

International Search Report and Written Opinion dated Aug. 25, 2014 from related PCT Serial No. PCT/US2014/026812, 10 pages.

*Primary Examiner* — Andrew L Sniezek

(57) ABSTRACT

An array may comprise a plurality of disk drives and a controller coupled to the plurality of drives. The controller may be configured to initiate spin-up of one or more first disk drives of the array; determine when each of the first disk drive(s) of the array for which spin-up was initiated reaches a predetermined spin rate that is less than a target spin rate at which the disk drive is ready to process data access commands; and initiate spin-up of one or more second disk drives of the array as the first disk drive(s) is determined to have reached the predetermined spin rate.

23 Claims, 3 Drawing Sheets

(56) References Cited

U.S. PATENT DOCUMENTS

| | | |
|---|---|---|
| 8,762,682 B1 | 6/2014 | Stevens |
| 8,780,004 B1 | 7/2014 | Chin |
| 8,793,374 B2 | 7/2014 | Hesselink et al. |
| 8,819,443 B2 | 8/2014 | Lin |
| 2002/0084760 A1* | 7/2002 | Messenger et al. .......... 318/439 |
| 2003/0115413 A1 | 6/2003 | Wood et al. |
| 2003/0212857 A1 | 11/2003 | Pacheco et al. |
| 2005/0141375 A1 | 6/2005 | Ehrlich et al. |
| 2005/0144195 A1 | 6/2005 | Hesselink et al. |
| 2005/0144200 A1 | 6/2005 | Hesselink et al. |
| 2005/0195694 A1* | 9/2005 | Lin ........................... 369/30.04 |
| 2005/0289364 A1 | 12/2005 | Strong et al. |
| 2006/0080483 A1* | 4/2006 | Ogasawara et al. ............. 710/74 |
| 2007/0192639 A1* | 8/2007 | Nichols et al. ................. 713/300 |
| 2011/0063750 A1 | 3/2011 | Kim et al. |
| 2012/0036041 A1 | 2/2012 | Hesselink |
| 2013/0212401 A1 | 8/2013 | Lin |
| 2013/0266137 A1 | 10/2013 | Blankenbeckler et al. |
| 2013/0268749 A1 | 10/2013 | Blankenbeckler et al. |
| 2013/0268759 A1 | 10/2013 | Blankenbeckler et al. |
| 2013/0268771 A1 | 10/2013 | Blankenbeckler et al. |
| 2014/0095439 A1 | 4/2014 | Ram |
| 2014/0169921 A1 | 6/2014 | Carey |
| 2014/0173215 A1 | 6/2014 | Lin et al. |

\* cited by examiner

METHODS AND SYSTEMS FOR OPTIMIZED STAGGERED DISK DRIVE SPINUP

BACKGROUND

The size of the power supply in Redundant Array of Independent Disks (RAID) controllers is conventionally limited to reduce costs. This forces the controller to limit the number of drives that can be spun-up simultaneously. Spinning up a disk drive may comprise bringing the disk pack thereof from an initial state in which the constituent platters that support the data-carrying magnetic material are not rotating to a state in which the constituent platters are spinning at the target or rated revolutions per minute or rpm. For current disk drives, such target rate may be, for example, 5400, 7200, 10,000 or 15,000 rpm. The number of disk drives that are spun-up simultaneously is limited in conventional arrays to limit the aggregate current draw from the power supply to within the specified capacity of the power supply to source such current. Indeed, if the current draw becomes too large, the power supply may fail, causing an unintended reset of the entire array.

Delayed "Time to First Data", or the period of time elapsed from initiating spin-up to the time at which the disk drive reports that it is ready to process data access commands, is a consequence of this limitation. This "Time to First Data" is significantly greater than the time necessary to spin-up the disk packs of the disk drives as the disk drives, after having reached their target spin rate, must energize the Voice Coil Motor (VCM) of the head disk assembly (HDA) to swing the actuator(s) over the disk surfaces, achieve sync with the encoded servo sectors and report drive readiness. This delay is a cumulative effect, in that the greater the number of drives in the array, the longer the array takes to come to ready state in which all constituent drives have reported that they are ready to process data access commands.

DETAILED DESCRIPTION

Figure 1:
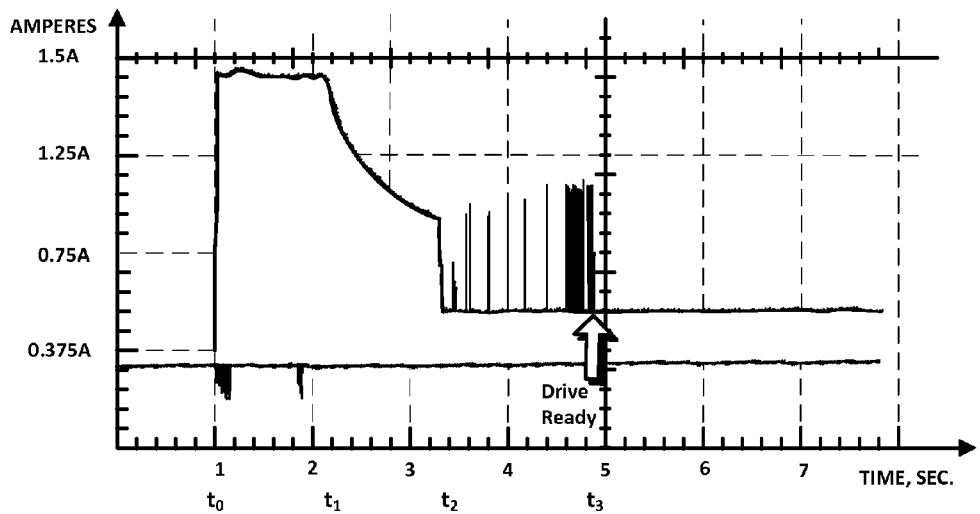
FIG. 1 is a graph showing the current drawn from a disk drive over time, from initiation of spin-up to the time at which the disk drive reports that it is ready to process data access commands.

FIG. 1 is a graph showing the current drawn from a disk drive over time, from initiation of spin-up to the time at which the disk drive reports that it is ready to process data access commands. As shown therein, at time $t_0$, the disk drive is commanded is to spin-up, at which point the disk drive draws about 1.44 amperes (A) from the power supply (not shown). This current draw is large, as the disk drive's spindle motor must overcome the inertia of the immobile disk pack, which manifests itself as a large back electro-motive force or BEMF, as seen across the spindle motor power terminals. This current draw continues at about this level until $t_1$, at about 1.2 seconds after initial spin-up, in the example being developed in FIG. 1. As the disk drive approaches its target spin rate (for example, 5400, 7200, 10,000 or 15,000 rpm), the current draw decreases, as does the BEMF decreases, as the spindle motor need exert less torque to increase the angular velocity of the disk pack. At about time $t_2$, the disk pack of the disk drive has reached its target spin rate (e.g., the aforementioned (for example, 5400, 7200, 10,000 or 15,000 rpm), whereupon the disk drive performs a number of operations aimed to bring the disk drive in condition to service data access commands. This condition is shown as "Drive Ready" in FIG. 1, at time $t_3$, about 3.9 seconds after the disk drive was commanded to spin-up, for an exemplary disk drive having the profile shown in FIG. 1.

Figure 2:
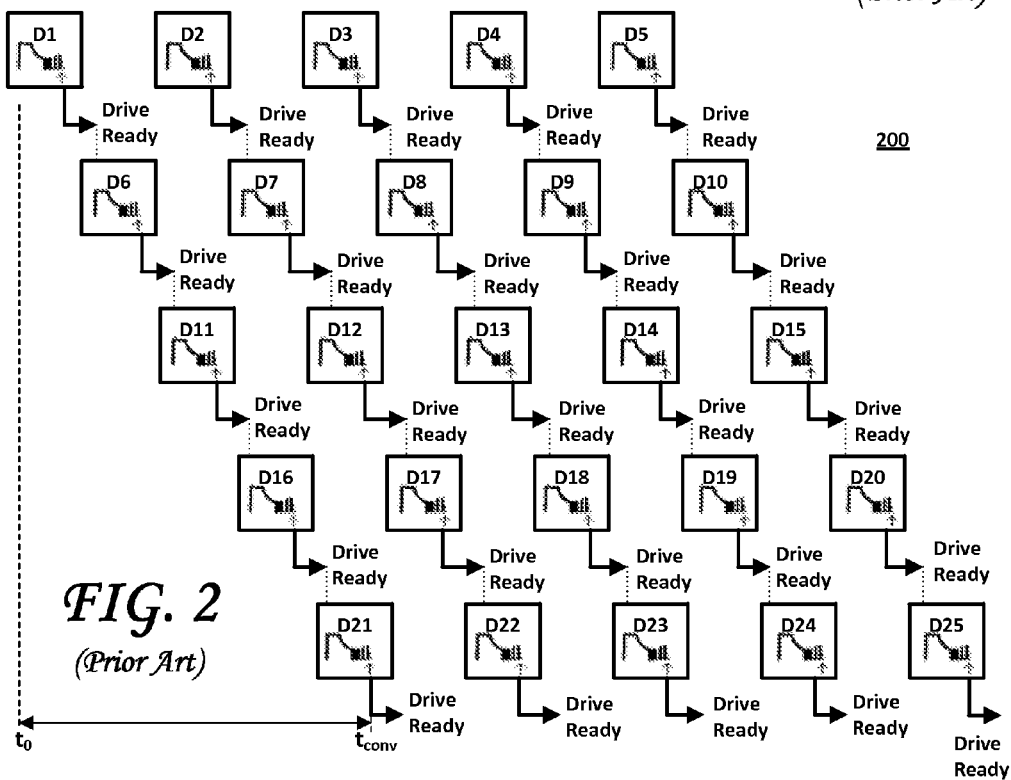
FIG. 2 is a graphical representation of a conventional array of disk drives and the time elapsed from initial spin-up to the time at which the last group of disk drives spun-up reports that they are ready to process data access commands.
Figure 3:
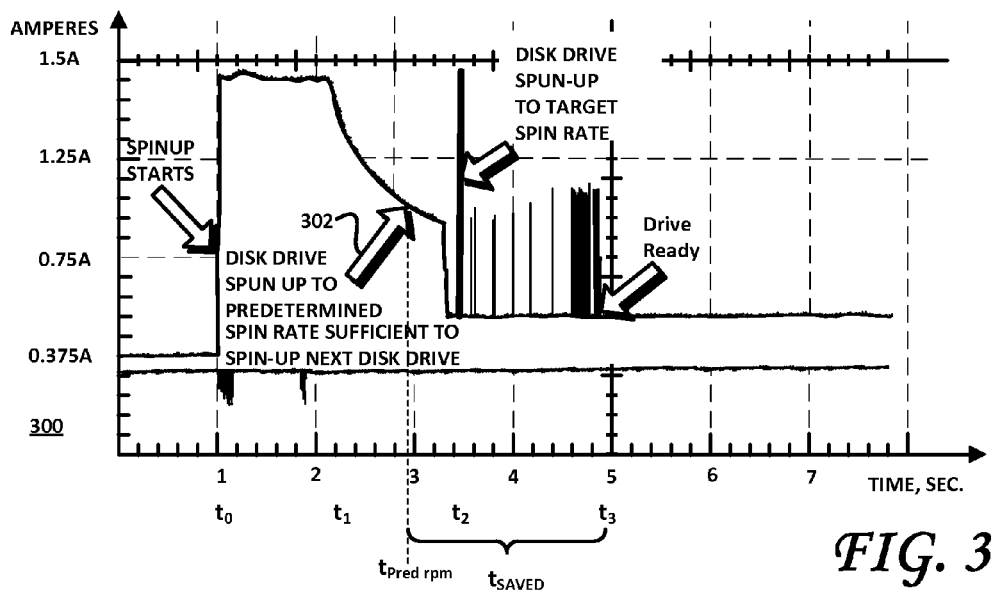
FIG. 3 is a graph showing the current drawn from a disk drive configured to be incorporated into an array over time, from initiation of spin-up to the time at which the disk drive reports that it is ready to process data access commands, according to one embodiment.

FIG. 2 is a graphical representation of a conventional array of disk drives and the time elapsed from initial spin-up to the time at which the last group of disk drives spun-up reports that they are ready to process data access commands. FIG. 3 shows an array 200 of 25 disk drives, labeled D1-D25. Such an array 200 may form a RAID. In such an array, the RAID controller, having only a predetermined number of amps from which the disk drives may draw during spin-up and during normal operation, may limit the number of disk drives that are spun-up simultaneously, in order to limit to aggregate current draw of the disk drives to within the specified limits of the RAID power supply. In the example of FIG. 2, the RAID controller (not shown), five disk drives are shown to be spun-up simultaneously, beginning with disk drives D1 through D5. As soon as these drives report "Drive Ready", the next group (i.e., disk drives D6-D10) of five drives may be spun-up. In turn, as these disk drives report "Drive Ready", the next group D11-D15 may be spun-up, followed by D16-D20 and ending with the last group of disk drives; namely, disk drives D21-D25. As shown in FIG. 2, the time interval elapsed between the initial group of disk drives being commanded to spin-up and the last group of drives reporting "Drive Ready" is shown in FIG. 2 as $t_{conv}$. While there may be some small variation across drives in the timing of the "Drive Ready" signal (assuming all drives within the array 200 are of the same type), such small variations may be safely ignored here.

FIG. 3 is a graph 300 showing the current drawn from a disk drive configured to be incorporated into an array over time, from initiation of spin-up to the time at which the disk drive reports that it is ready to process data access commands, according to one embodiment. It is to be noted that embodiments are equally applicable to hybrid disk drives; that is, to data storage devices comprising both rotating media and solid state memory. According to one embodiment, the current profile of the constituent disk drives of an array may be used to good advantage in enabling next sequential disk drive(s) to be spun-up sooner than shown in FIGS. 1 and 2. According to one embodiment, a predetermined spin rate 302 may be established. This predetermined spin rate may be, as suggested in FIG. 3, less than the target spin rate of the disk drive. Moreover, according to one embodiment, this predetermined spin rate 302 is reached sooner than the disk drive would otherwise reach the disk drive's target spin rate (the aforementioned 5400, 7200, 10,000 or 15,000 rpm) and sooner than the disk drive indicates its readiness to process data access commands. According to one embodiment, the current drawn from the disk drive when the disk drive reaches the predetermined spin rate is sufficiently low as to enable the next disk drive or disk drives to be spun-up without overloading the power supply. Moreover, as shown at 304, the time elapsed between $t_0$, meaning the point in time at which the disk drive was commanded to spin-up and $t_{Pred\ rpm}$, the time at which the predetermined spin rate has been reached, is less than from $t_0$ to $t_3$, the point in time at which the disk drive has indicated that it is ready to process data access commands. Moreover, the interval from $t_0$ to $t_{Pred\ rpm}$ is less than the time interval from $t_0$ to the period in time at which the disk drive has reached its target spin rate. From inspection of the embodiment of FIG. 3, it can be seen that the next sequential disk drive in the array may be spun-up about $t_{Saved}=t_3-t_{Pred\ rpm}$ or about 2.1 seconds sooner than would otherwise be the case had controller waited until the disk drive announced Drive Ready at t3 to spin-up the next sequential disk drive(s) or about 750 ms faster than would be the case had the controller waited until the disk drive reached its target spin rate before spinning up one or more next sequential disk drives.

According to one embodiment, the predetermined spin rate may be predetermined for each kind, type or model of disk drives. Indeed, such predetermined spin rate may be determined by the manufacturer for each disk drive kind, type or model. Alternatively, the predetermined spin rate may be predetermined for each individual disk drive. For example, such predetermined spin rate may be set by the manufacturer at the time of, for example, Initial Burn In or IBI. According to one embodiment, the predetermined spin rate may be a predetermined percentage of the target spin rate. For example, the predetermined spin rate may be selected to be between about 20% and about 90% of the target spin rate of the disk drive. According to one embodiment, the predetermined percentage may be selected to be between about 50% and about 80% of the target spin rate of the disk drive. For example, the predetermined percentage may be selected to be about 75% of the target spin rate of the disk drive. Accordingly, for a 7200 rpm disk drive and a predetermined percentage of 75%, the array controller may command the next sequential disk drive or disk drives to spin-up when the disk drive is determined to have reached a spin rate of about 5,400 rpm.

Figure 4:
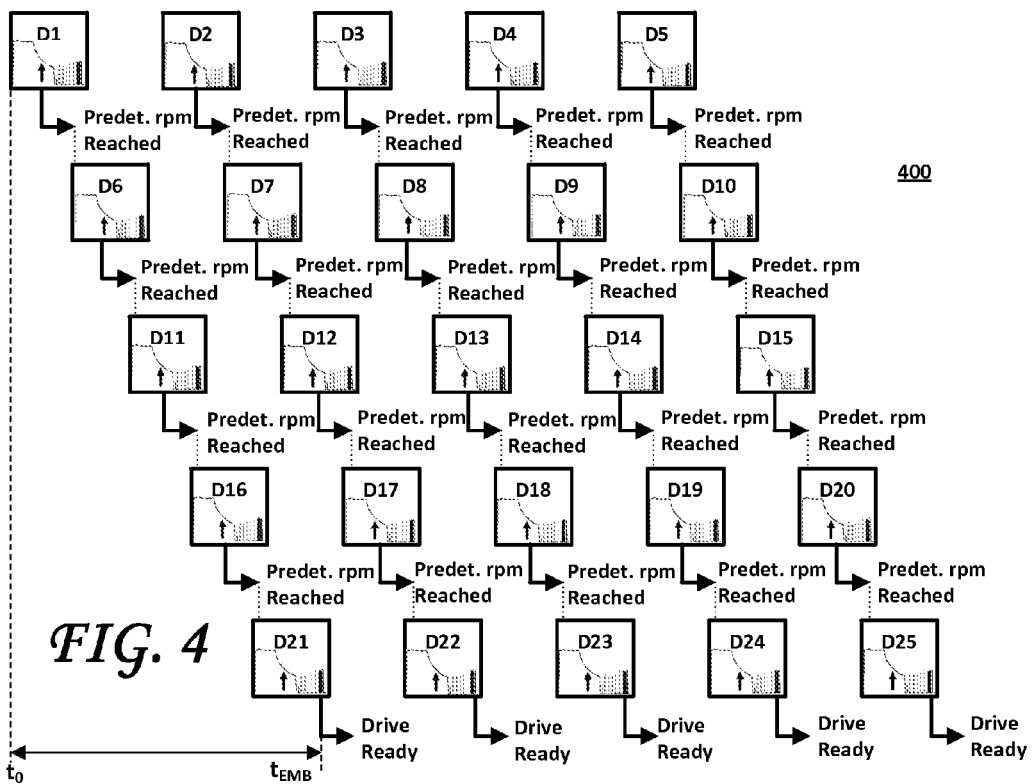
FIG. 4 is a graphical representation of an array of disk drives, according to one embodiment.

FIG. 4 is a graphical representation of an array of disk drives, according to one embodiment. As shown therein, instead of spinning up a next sequential disk drive or disk drives upon the disk drive(s) reporting readiness to process data access commands, the controller may be configured, according to one embodiment, to command the next sequential disk drive or disk drives to spin-up as soon as (or shortly after) the disk drive(s) have reached or exceeded a predetermined spin rate. As shown in FIG. 4, the arrows within the current profiles shown within the disk drives D1-D25 signal the point in time at which the next sequential drive or drives of the array may be spun-up. As shown in FIG. 4, the entire array 400 may be considered to be ready for unrestricted reads and writes to all of its constituent disk drives when the last disk drive has indicated that it is ready to process data access commands, as noted by the "Drive Ready" legend in FIG. 4. According to one embodiment, the time interval elapsed between $t_0$, the time at which the controller commands the first disk drive or group of disk drives to spin-up and $t_{Emb}$, the time at which the last disk drive or the last group of disk drives indicates that it is ready to process data access commands, may be less than the corresponding time interval $t_0$ to $t_{Conv}$ shown in FIG. 2. It is to be understood that $t_{Emb}$ may correspond to the point in time at which the last disk drive reports that it is ready to process data access commands. However, as the disk drives of array 400 may be substantially identical (i.e., same make and model), the disk drives shown in the last spun-up group; namely, disk drives D21 to D25, may report being ready to support data access commands at substantially the same time, with minimal variations from drive to drive. Although such variations are acknowledged, they may be safely ignored herein for purposes of illustration and explanation.

Figure 5:
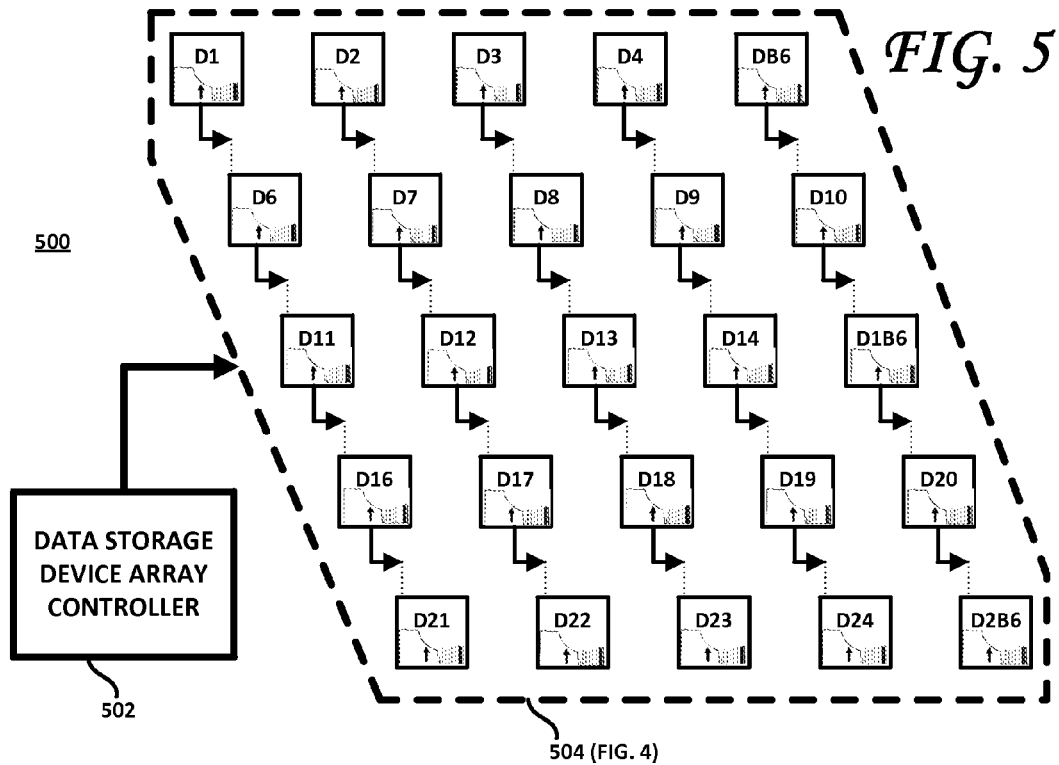
FIG. 5 is a block diagram of a data storage device controller configured to couple to a plurality of data storage devices, according to one embodiment.
Figure 6:
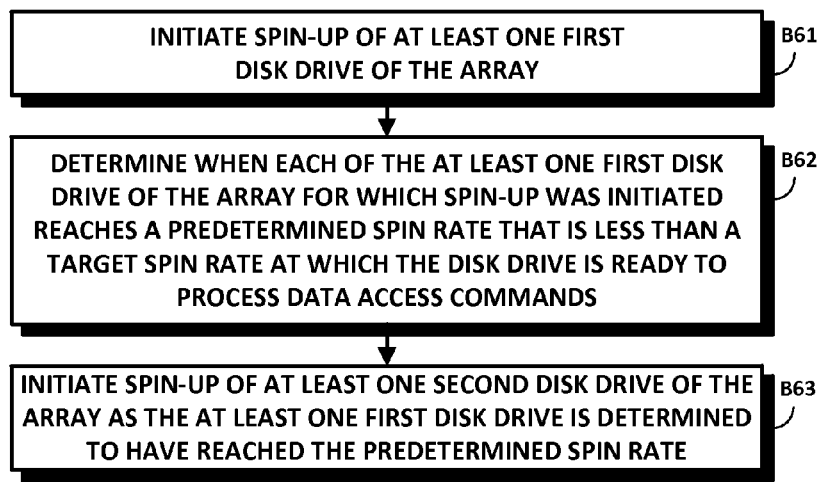
FIG. 6 is a flowchart of a method according to one embodiment.

FIG. 5 is a block diagram of a data storage device controller 502 configured to couple to a plurality of data storage devices, according to one embodiment. As shown, the controller 502 may be configured to couple to a plurality 504 of disk drives. Such plurality of disk drives 504 may be organized as an array of disk drives. For example, reference 504 may denote a RAID. The data storage device (e.g., disk drive) controller 502 may be configured, according to one embodiment, to carry out the method of FIG. 6. As shown therein, block B61 calls for the controller 502 to initiate spin-up of at least one first disk drive of the array. For example, and with reference to FIGS. 4 and 5, the controller 502 may command one or more disk drives of the first row (disk drives D1-D5) to spin-up. Such first disk drives may, therefore, be found in the first row of the disk drives shown in FIGS. 4 and 5. It is to be understood that five disk drives per row is shown in FIGS. 4 and 5 for illustrative and exemplary purposes only. In an actual implementation, the array 504 may be, for example, a RAID comprising fifty or more disk drives, which may be spatially and/or logically arranged in a manner that is different than that shown in FIGS. 4 and 5. As called for by block B52, the controller 502 may determine when each of the one or more first disk drives of the array for which spin-up was initiated reaches a predetermined spin rate that is less than a target spin rate at which the disk drive is ready to process data access commands. When the platters of such one or more first disk drives reach the predetermined spin rate, the controller at block B63 may initiate spin-up of one or more second disk drives. Such one or more second disk drives may comprise a single disk drive of the array 504 or may comprise, for example, an entire row (or other relevant grouping) of disk drives. For example, with reference to FIGS. 4 and 5, the controller 502, having determined that disk drives D1-D5 have each reached the predetermined spin rate, may command next sequential second disk drives D6-D10 to spin-up, as a group. Alternatively, as each disk drive D1-D5 reaches the predetermined spin rate, individual ones of the second disk drives D6-D10 may be spun-up in turn. If the second disk drives are not spun-up in groups of predetermined size, the controller 502 may ensure that no more than a maximum number of disk drives spins-up at any given time, to keep the aggregate current draw within the specified capacity of the power supply to source such aggregate current.

According to one embodiment, the controller 502 may be configured to poll the disk drives to determine when they have reached the predetermined spin rate. According to one embodiment, code controlling the disk drive spindle motor may be configured to update a status bit when the predetermined spin rate has been reached or exceeded. Such status bit may then be interrogated or polled by the controller 502 to enable the determination of when the predetermined spin rate has been reached. Alternatively, the disk drives of the array 504 may be configured to set one or more page codes of one or more mode pages (e.g., for Small Computer System Interface (SCSI) drives) when the predetermined spin rate has been reached. In this embodiment, the controller 502 may be configured to interrogate the mode page(s) to determine the set page code(s), and to interpret the obtained page codes to determine when the predetermined spin rate has been reached. Alternatively still and according to one embodiment, the controller 502 may be configured to determine when the disk drives have reached the predetermined spin rate by issuing an Inquiry command, in the case wherein the array 504 comprises Serial Advanced Technology Attachment (SATA) disk drives.

According to one embodiment, the controller 502 and the array of disk drives 504 may be configured such that the controller 502 may determine that the predetermined spin rate has been reached at least about 250 ms prior to the disk drives indicating being ready to process data access commands. According to one embodiment, the controller 502 may determine that the predetermined spin rate has been reached at least about 500 ms to at least about 2 seconds prior to the disk drives indicating being ready to process data access commands. For example, the controller 502 may determine that the predetermined spin rate has been reached at least about 1 second prior to the disk drives indicating being ready to process data access commands. Other timings are possible. Alternatively still and according to one embodiment, the determination of having reached the predetermined spin rate may be made by the controller 502 monitoring the BEMF exhibited by the disk drives during spin-up. That is, when the disk drive(s) exhibit a BEMF that has dropped to or below a threshold point corresponding to the disk drive having spun-up to the predetermined spin rate, the next sequential disk drive or drives may be commanded to spin-up. According to one embodiment, the firmware of the disk drives of the array 504 may be configured to report to the controller 502 when the predetermined spin rate has been reached. Such reporting may take the form of, for example, setting one or more bits that, when evaluated by a polling controller 502, are indicative of the disk drive having reached its predetermined spin rate.

Advantageously, embodiments may take good advantage of prior knowledge of the disk drive spin-up, current or BEMF profile of disk drives to enable a greater number of disk drives to be spun-up than is conventionally possible. Alternatively, a smaller power supply may be used than would otherwise be conventionally possible. Parameters other than that described herein may be used to determine when the disk drives have reached the predetermined spin-rate. For example, analysis of the vibrations or audio signature of the drive may be indicative of the current spin rate of the disk drive. Moreover, according to one embodiment, the predetermined spin rate may be dynamically adjusted to ambient conditions that may affect the spin rate of the disk drive or the rate at which the disk drive platters are accelerated to reach their target spin rates. According to one embodiment, the "Time to First Data" may be significantly improved in RAID and other installations.

While certain embodiments of the disclosure have been described, these embodiments have been presented by way of example only, and are not intended to limit the scope of the disclosure. Indeed, the novel methods, devices and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. An array, comprising:
a plurality of disk drives; and
a controller coupled to the plurality of drives, the controller being configured to:
initiate spin-up of at least one first disk drive of the array;
interrogate each of the at least one first disk drive during spin-up;
obtain information from the interrogated each of the at least one first disk drive while each of the at least one first disk drive is still spinning up;
based upon the information obtained and, while each of the at least one first disk drive was still spinning up, determine when each of the at least one first disk drive of the array for which spin-up was initiated reaches a predetermined spin rate that is less than a target spin rate at which the disk drive is ready to process data access commands; and
initiate spin-up of at least one second disk drive of the array as the interrogated at least one first disk drive is determined to have reached the predetermined spin rate.

2. The array of claim 1, wherein the controller is further configured to initiate spin-up of at least one second disk drive as each of the at least one first disk drive is determined to have reached the predetermined spin rate.

3. The array of claim 1, wherein the predetermined spin rate is predetermined for each kind of disk drive.

4. The array of claim 1, wherein the predetermined spin rate is predetermined for each disk drive.

5. The array of claim 1, wherein the predetermined spin rate is a predetermined percentage of the target spin rate.

6. The array of claim 1, wherein at least one of the first and second disk drives is configured to set at least one page code of at least one mode page when the predetermined spin rate has been reached and wherein the controller is further configured to obtain the information by interrogating the mode pages of the at least one of the first and second disk drives to determine the set page codes.

7. The array of claim 1, wherein the controller is configured to obtain the information by interrogating each of the at least one first disk drive by issuing an inquiry command to the at least one of the first and second disk drives.

8. The array of claim 1 wherein, for at least one of the first and second disk drives, the predetermined spin rate is reached at least one second prior to the disk drive indicating being ready to process data access commands.

9. The array of claim 1 wherein, for at least one of the first and second disk drives, the controller is configured to obtain the information by interrogating each of the at least one first disk drive by determining the back electro-motive force (BEMF) exhibited by the at least one of the first and second disk drives during spin-up.

10. The array of claim 1, wherein the first and second disk drives each comprises firmware configured to report to the controller when the predetermined spin rate has been reached.

11. The array of claim 1, wherein the array is configured as a Redundant Array of Independent Disks (RAID).

12. A method, comprising:
- initiating spin-up of at least one first disk drive of an array of disk drives;
- interrogating each of the at least one first disk drive during spin-up;
- obtaining information from the interrogated each of the at least one first disk drive while each of the at least one first disk drive is still spinning up;
- based upon the information obtained and while each of the at least one first disk drive was still spinning up, determining when each of the at least one first disk drive of the array for which spin-up was initiated reaches a predetermined spin rate that is less than a target spin rate at which the disk drive is ready to process data access commands; and
    - initiating spin-up of at least one second disk drive of the array as the interrogated at least one first disk drive is determined to have reached the predetermined spin rate.

13. The method of claim 12, wherein initiating spin-up of the at least one second disk drive comprises initiating spin-up of the at least one second disk drive as each of the at least one first disk drive is determined to have reached the predetermined spin rate.

14. The method of claim 12, wherein the predetermined spin rate is predetermined for each kind of disk drive.

15. The method of claim 12, wherein the predetermined spin rate is predetermined for each disk drive.

16. The method of claim 12, wherein the predetermined spin rate is a predetermined percentage of the target spin rate.

17. The method of claim 12, further comprising at least one of the first and second disk drives setting at least one page code of at least one mode page when the predetermined spin rate has been reached and wherein interrogating comprises obtaining the information by interrogating the mode pages of the at least one of the first and second disk drives to determine the set page codes.

18. The method of claim 12, wherein interrogating comprises obtaining the information by issuing an inquiry command to the at least one of the first and second disk drives.

19. The method of claim 12 wherein, for at least one of the first and second disk drives, the predetermined spin rate is reached at least one second prior to the disk drive indicating being ready to process data access commands.

20. The method of claim 12, further comprising obtaining the information by determining the back electro-motive force (BEMF) exhibited by the at least one of the first and second disk drives during spin-up.

21. The method of claim 12, further comprising reporting, by at least one of the first and second disk drives, when the predetermined spin rate has been reached.

22. The method of claim 12, further comprising configuring at least some of the first and second disk drives as a Redundant Array of Independent Disks (RAID).

23. A data storage device controller configured to couple to a plurality of disk drives, the data storage device controller being configured to:
- initiate spin-up of at least one first disk drive of the plurality of disk drives;
- interrogate each of the at least one first disk drive during spin-up;
- obtain information from the interrogated each of the at least one first disk drive while each of the at least one first disk drive is still spinning up;
- based upon the information obtained and while each of the at least one first disk drive was still spinning up, determine when each of the at least one first disk drive of an array for which spin-up was initiated reaches a predetermined spin rate that is less than a target spin rate at which the disk drive is ready to process data access commands; and
    - initiate spin-up of at least one second disk drive of the array as the interrogated at least one first disk drive is determined to have reached the predetermined spin rate.

\* \* \* \* \*